United States Patent
Mori et al.

(10) Patent No.: US 6,364,415 B1
(45) Date of Patent: Apr. 2, 2002

(54) HEAD REST FOR VEHICLE SEAT (75) Inventors: Masatoshi Mori; Kouji Miyake, both of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/624,914

(22) Filed: Jul. 24, 2000

(30) Foreign Application Priority Data

Jul. 29, 1999 (JP) ............................................ 11-215564
Sep. 29, 1999 (JP) ............................................ 11-276669

(51) Int. Cl.⁷ .............................................. A61G 15/00
(52) U.S. Cl. ..................................................... 297/410
(58) Field of Search .................................. 297/410, 391

(56) References Cited

U.S. PATENT DOCUMENTS

| 4,923,250 | A | * | 5/1990 | Hattori |
| 5,222,784 | A | * | 6/1993 | Hamelin |
| 5,288,129 | A | * | 2/1994 | Nemoto |
| 5,433,508 | A | * | 7/1995 | Akima et al. |

FOREIGN PATENT DOCUMENTS

| JP | 6-50547 | 7/1994 |
| JP | 7-79837 | 3/1995 |

* cited by examiner

*Primary Examiner*—Milton Nelson, Jr.
(74) *Attorney, Agent, or Firm*—Burns, Doane, Swecker & Mathis, LLP

(57) ABSTRACT

A head rest device for a vehicle seat includes a stay member supporting a head rest and attached to the upper portion of the seat back of the vehicle seat. The stay member includes a pair of stay shafts extending downwardly from the head rest. The head rest device further includes a position adjusting mechanism for adjusting the position of the head rest relative to the seat back. The position adjusting mechanism includes a drive motor, a drive shaft operatively connected to the drive motor and extending in the vertical direction of the vehicle, a vertically movable nut member in engagement with the drive shaft, a movable member secured to the nut member and vertically movable with the nut member, a guide member for guiding the vertical movement of the movable member, and a stopper member connecting the movable member with the lower end of the stay shafts of the stay member for restricting the position of the movable member. The drive shaft and the guide member are disposed in the seat back in parallel with each other, extend vertically, and are separately arranged in spaced apart relation with respect to the lateral direction of the seat back of the vehicle seat.

18 Claims, 8 Drawing Sheets

HEAD REST FOR VEHICLE SEAT

This application is based on and claims priority under 35 U.S.C. § 119 with respect to Japanese Application No. 11(1999)-215564 filed on Jul. 29, 1999 and Japanese Application No. 11(1999)-276669 filed on Sep. 29, 1999, the entire content of both of which is incorporated herein by reference.

FIELD OF THE INVENTION

This invention generally relates to a head rest. More particularly, the present invention pertains to a head rest device for a vehicle seat for resting the head portion of a seated occupant.

BACKGROUND OF THE INVENTION

To enlarge the vehicle interior space as much as possible, demands have been placed on vehicle manufacturers to reduce the thickness of the seat back. This is particularly so in the case of the front seat design to ensure that the occupants seated in the rear of the vehicle have a spacious area for their knees.

Vehicle seats are typically provided with a head rest and it is desirable that the position of the head rest be adjustable in the vertical direction to properly receive the head portion of the occupant of the seat. The position adjusting device for adjusting the vertical position of the head rest usually disposed in the seat back of the seat.

One known type of vehicle head rest device is disclosed in Japanese Utility Model Application Laid-Open No. H6(1994)-50547. This head rest device includes a guide member for a movable member of the head rest position adjusting device and a drive shaft for moving the head rest in the vertical direction. A portion of the panel of the device to which a motor is secured is used as the guide member for the head rest stay. The guide member and the drive shaft are disposed in the seat back of the vehicle seat assembly so as to be parallel to one another in the vehicle longitudinal direction.

However, because the guide and the drive shaft for adjustably moving the head rest in the vertical direction are disposed in line in the longitudinal direction of the vehicle, the position adjusting device mechanism occupies a thicker space in the longitudinal direction of the vehicle and thus does not leave sufficient space for the legs of the passengers seated in the rear seat.

Another known device is disclosed in Japanese Patent Application Laid-Open Publication No. H7(1995)-79837. This device includes a pair of bearings disposed in the seat back for slidably moving the head rest stay in the vertical direction. The bearings are positioned separately in vertical direction.

With this device, in order to have a more close contact of the passenger head portion with the head rest, the headrest is moved forwardly during upward adjustment of the head rest with respect to the vertical track. In this case, the vertical track actuating mechanism for the position adjusting device is adapted to minimize the seat back thickness.

However, this particular construction suffers from the drawback that the upward or downward movement of the head rest is performed with a fulcrum at the upper bearing where most of the load is concentrated on its small bearing surface. Thus the bearing itself has to have sufficient strength to endure such concentrated load at its pivotal points.

In light of the foregoing, a need exists for an improved vehicle seat head rest which is not susceptible to the same disadvantages and drawbacks as those mentioned above.

SUMMARY OF THE INVENTION

According to the present invention, a head rest device for a vehicle seat includes a stay member supporting a head rest and attached to the upper portion of a seat back of the vehicle seat. The stay member includes a pair of stay shafts extending downwardly from the head rest. A position adjusting device adjusts the head rest position relative to the seat back, with the position adjusting device being disposed in the seat back and including a drive motor, a drive shaft operatively connected to the drive motor and extending from the drive motor, a nut member in engagement with the drive shaft and vertically movable, a movable member secured to the nut member and vertically movable with the nut member, a guide member for guiding the vertical movement of the movable member, and a stopper member connecting the movable member with the lower end of each stay shaft of the stay member for restricting the vertical position of each stay shaft with respect to the movable member. The drive shaft and the guide member are disposed in the seat back in parallel with each other and extending downwardly. The drive shaft and the guide member are separately arranged in the lateral direction of the seat back of the vehicle seat.

The head rest device of the present invention enables the thickness of the seat back in the vehicle longitudinal direction to be minimized so that vehicle interior space is enlarged. Particularly, when the present invention is applied to a front seat, it is possible to provide additional leg or knee space for passengers in the rear seats, thus improving their comfort.

The head rest stay shafts have a bending portion bent rearward and so the head of the occupant may be closely contacted by the head rest cushion when the head rest is in use. Additionally, the head rest stay shafts of the head rest device are slidably supported by a larger bearing surface for receiving a load due to the same curvature or inclination of the bending portion of the stay shafts and the guide member slidably receiving the stay shafts. Further, in spite of the curved or inclined up and down track of the head rest device, the head rest position adjusting device adopts a linear movement actuating mechanism to minimize the thickness of the seat back.

According to another aspect of the invention, a head rest device for a vehicle seat includes a stay member attached to an upper portion of a seat back of a vehicle seat and supporting a head rest, with the stay member including at least one stay shaft extending downwardly from the head rest. A position adjusting device is disposed in the seat back for adjusting the position of the head rest relative to the seat back. The position adjusting device includes a drive motor, a threaded drive shaft operatively connected to and extending from the drive motor, a nut member threadably engaging the drive shaft and vertically movable along the drive shaft, a movable member secured to the nut member and vertically movable with the nut member, and a guide member for guiding the vertical movement of the movable member. The drive shaft and the guide member are disposed substantially parallel to one another and are spaced apart from one another in a plane extending in a lateral direction of the seat back.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 6:
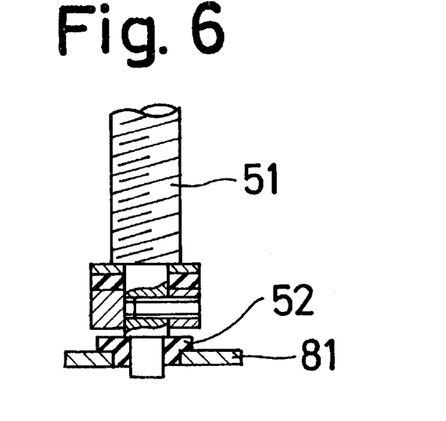
FIG. 6 is a cross-sectional view of the drive bearing portion of the head rest taken along the section line VI—VI in FIG. 2.
Figure 7:
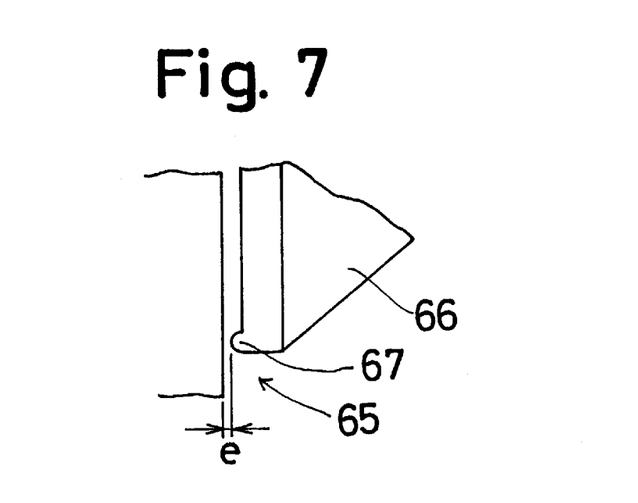
FIG. 7 is an enlarged side view of the portion of the head rest identified as VII in FIG. 2.
Figure 8:
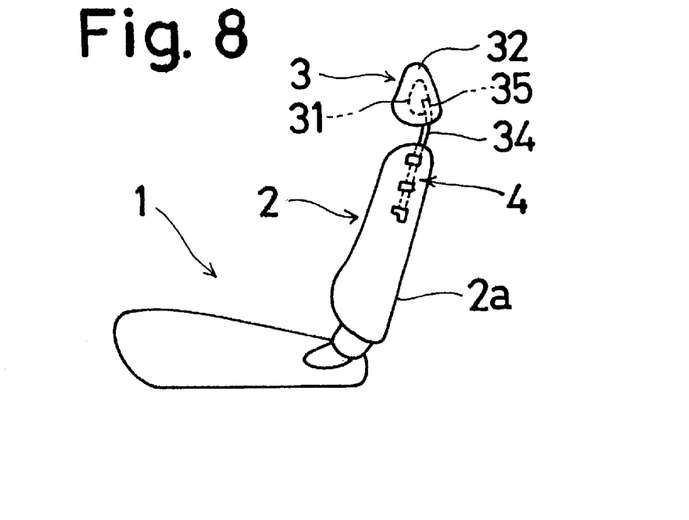
FIG. 8 is a side view of a seat assembly on is mounted the first embodiment of the head rest device of the present invention.

Referring to FIGS. 1–8, the first embodiment of the head rest 3 of a vehicle seat assembly 1 according to the present invention is positioned on the top of a seat back 2 of the vehicle seat assembly 1 as shown in FIG. 8. The position of the head rest 3 is adjustable in generally the vertical direction by a head rest position adjusting device 4.

Figure 1:
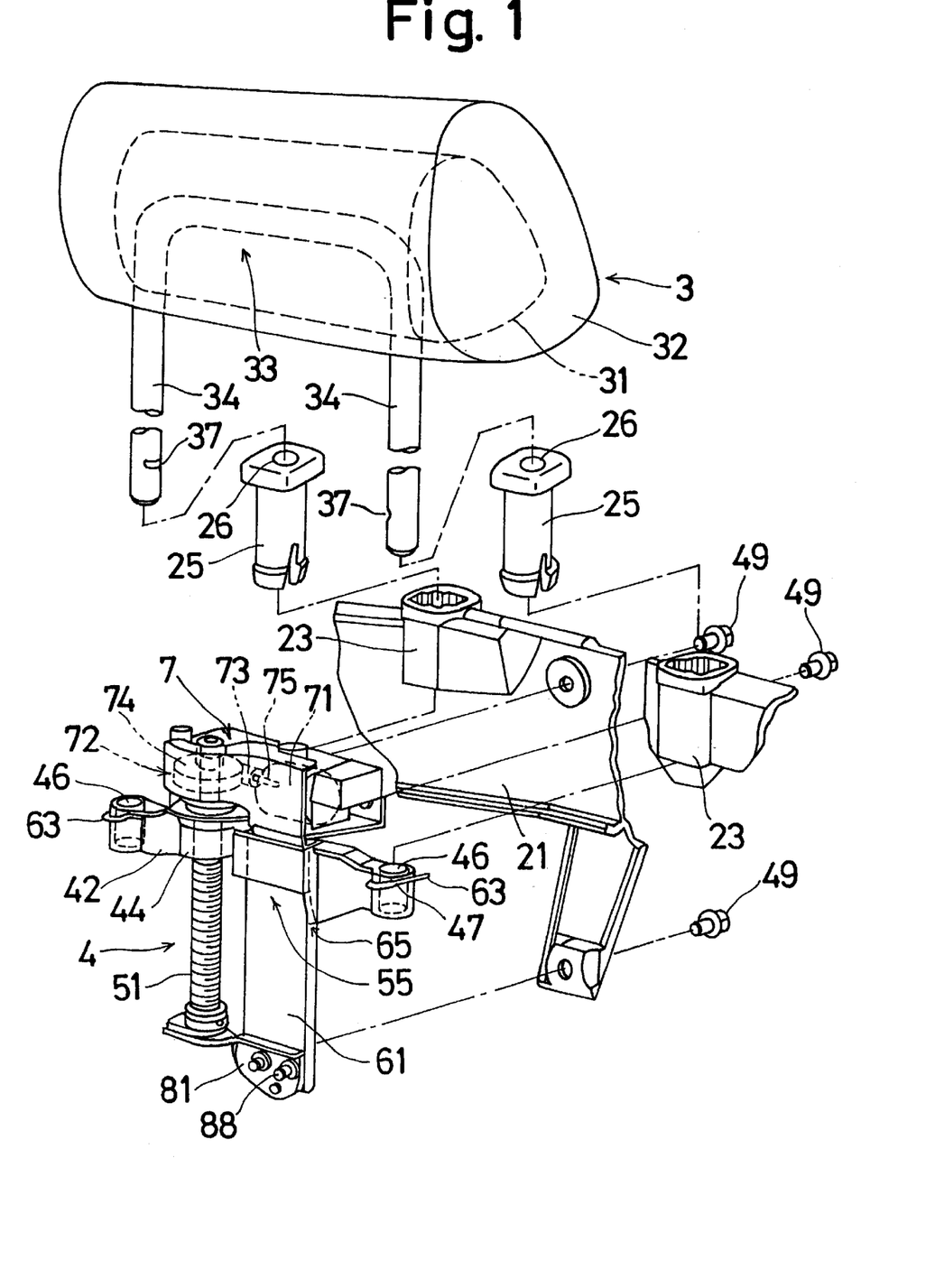
FIG. 1 is an exploded perspective view of a first embodiment of the head rest according to the present invention.

The head rest 3 includes a head rest frame 31 covered by a head rest cushion 32 and a head rest stay member 33 having a reverse U-shape. The head rest stay member 33 is secured to the head rest frame 31 at the horizontal bar portion of the reverse U-shape frame. In addition to the horizontal bar portion, the head rest stay member 33 includes two vertical bar portions forming stay shafts 34 that extend downwardly from the ends of the horizontal bar portion into the seat back 2.

Referring to FIG. 1, the seat back includes a seat back frame 21 within a seat back cushion 2a (FIG. 8). The seat back frame 21 includes a pair of stay guide holes 23 in which the stay shafts 34 are inserted to support the head rest 3. These stay guide holes 23 are provided at each side portion of the seat back frame 21 and are parallel with each other.

Two stay guides 25 are inserted into each stay guide hole 23 and have through holes 26, 26 extending in the vertical direction. The stay shafts 34 of the head rest stay member 33 are slidably inserted into the through holes 26 of the stay guides 25.

The position adjusting device 4 of the head rest 3 is firmly attached to the seat back frame 21 by several screws 49. The position adjusting device 4 includes a vertically extending screw threaded drive shaft 51 and a guide member 61. The drive shaft 51 and the guide member 61 are separated from one another in the lateral direction of the seat back (i.e., the lateral direction of the vehicle) and are positioned in a substantially common plane extending in the lateral direction of the seat back (i.e., the lateral direction of the vehicle). The guide member 61 is in the form of a plate member possessing a U-shaped cross-section and extends parallel with the drive shaft 51 in the vehicle width direction (on the right side of the drive shaft 51 in FIG. 2).

Figure 2:
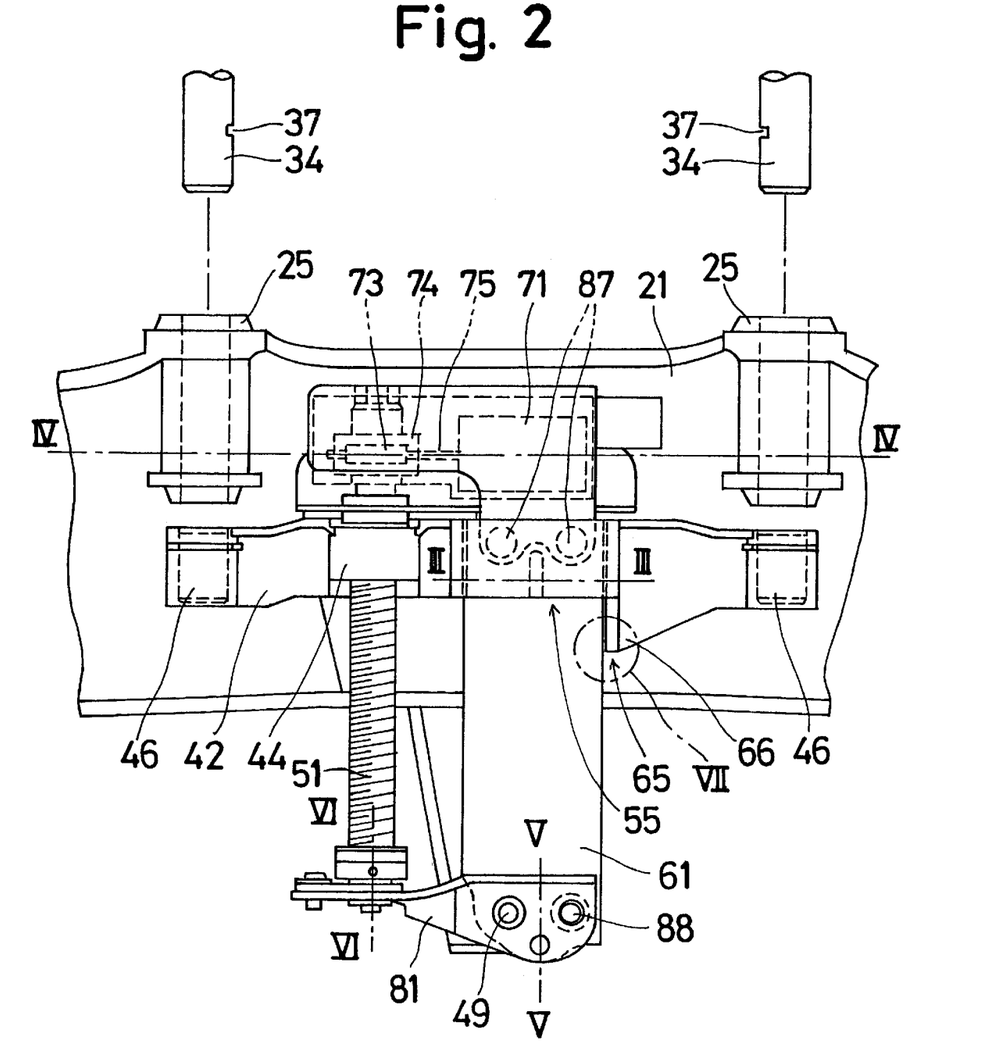
FIG. 2 is a front view of the head rest shown in FIG. 1.

The position adjusting device 4 further includes a movable member 42 and a motor unit 7. The motor unit 7 is located at a position above the guide member 61 and the drive shaft 51 for driving the movable member 42 that is operatively engaged with the drive shaft 51. As better seen in FIG. 4, the motor unit 7 includes a motor 71, a motor output shaft 75, a worm gear 73 connected to the output shaft 75, and a wheel gear 74 driven by the worm gear and transmitting rotational torque to the drive shaft 51. These gears and motor form a reduction gear mechanism 72. The location of the drive shaft 51 is preferably determined by the location of the motor unit 7 which can be located between the two stay shafts 34.

The movable member 42 includes a nut member 44 for engaging the screw threaded portion of the drive shaft 51. The movable member 42 further includes a pair of holes 46, each located at one side for receiving one of the stay shafts 34. The inner diameter of the each hole 46 is slightly larger than the outer diameter of each stay shaft 34 so that the stay shafts 34 are positionable in the respective hole 46 with a slight gap.

The outer periphery of each stay shaft 34 is provided with a stopper groove 37. The outer periphery of the structure surrounding the holes 46 is provided with a horizontal pin groove 47 and generally U-shaped pins 63 are inserted or positioned in these grooves 47. When the stay shafts 34 are inserted into the holes 46, the stopper grooves 37 of the stay shafts 34 engage the U-shaped pins 63 which are inserted in the horizontal grooves 47 of the holes 46, and the stay shafts 34 are held in the holes 46.

Figure 3:
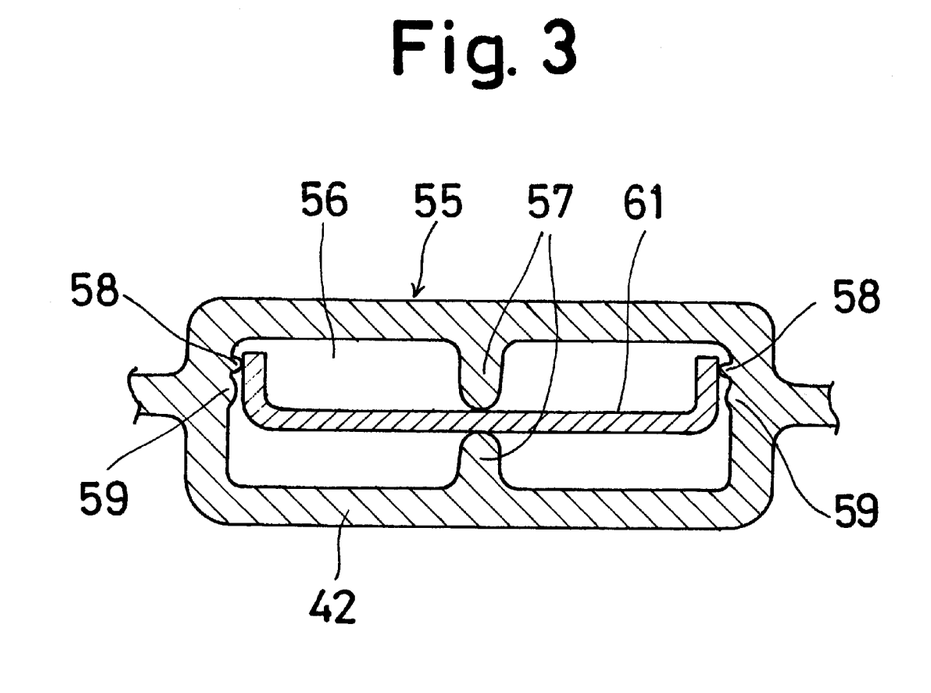
FIG. 3 is a cross-sectional view of a portion of the head rest taken along the section line III—III in FIG. 2.
Figure 4:
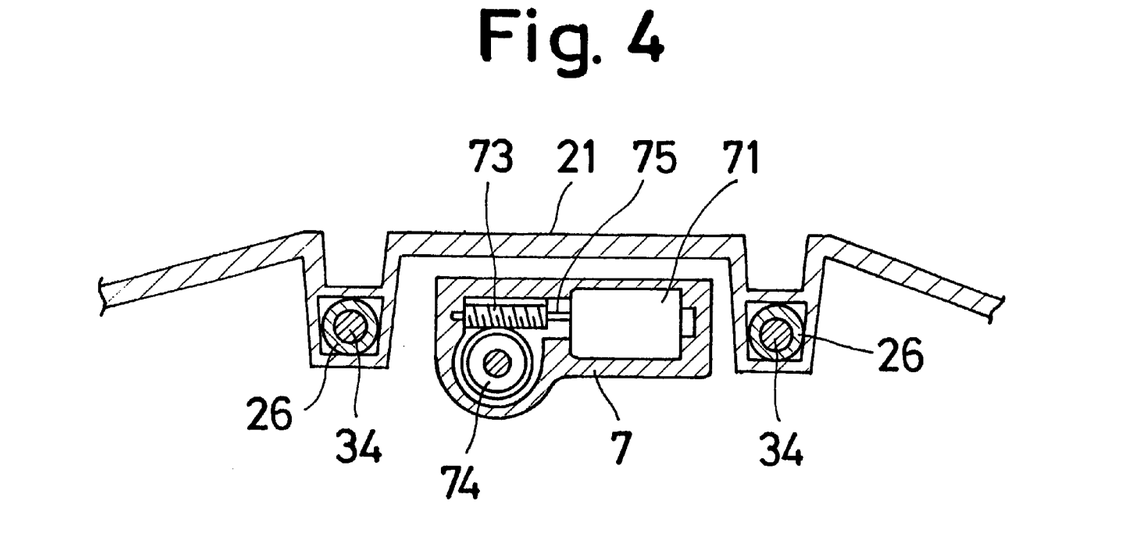
FIG. 4 is a cross-sectional view of the motor assembly portion of the head rest taken along the section line IV—IV in FIG. 2.

The movable member 42 further includes a first slidable portion 55 and a second slidable portion 65. The first slidable portion 55 is formed with projections 57, 58, 59 provided on the inner wall surrounding a generally rectangular hole 56 which encloses the guide member 61 as clearly shown in FIG. 3. The projections 57 are provided at the central portion of the inner wall that surrounds the hole 56 to sandwich the guide member 61 from both sides of the bottom portion of the U-shaped guide member 61. The projections 58, 59 are provided at each side of the inner wall surrounding the hole 56 and engage the outer surface of each vertical portion of the U-shaped guide member 61. Thus, one of the projections 58 and one of the projections 59 is provided on each side of the inner wall as shown in FIG. 3. The projections 58 are formed so that the height (i.e., the inward extent) of the projection 58 is greater than the height (i.e., the inward extent) of the projections 59. In addition, the width of the projections 58 is thinner than the width of the projections 59. The dimensions of the projections 58, 59 are determined, in light of the manufacturing tolerances of the guide member 61, so as to permit sliding contact between the guide member 61 and the slidable portion of the movable member 42 for guiding the slidable movement of the movable member 42.

The second slidable portion 65 is shown in FIG. 2 as the circled portion VI and is depicted in FIG. 7. This portion 65 is located opposite to the nut member 44 with respect to the first slidable portion 55. The second slidable portion 65 includes an arm portion 66 extending downwardly from the side wall surrounding the rectangular hole 56, and a projection 67 provided on the lower end of the arm portion 66. The projection 67 projects toward the guide member 61 while maintaining a slight gap e between the projection 67 and the guide member 61.

When the movable member 42 is movably operated, the projection 67 contacts the guide member 61 so that the two are in slidable engagement with one another.

As shown in FIGS. 2 and 6, a bracket 81 is secured to the lower end of the guide member 61. As shown in FIG. 6, a bearing member 52 is provided at an extending portion of the bracket 81 to rotatably support the lower end of the drive shaft 51.

Figure 5:
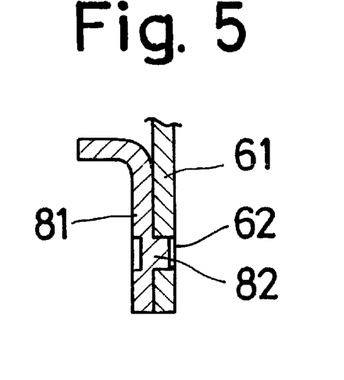
FIG. 5 is a cross-sectional view of a portion of the head rest taken along the section line V—V in FIG. 2.

The guide member 61 further includes a positioning recess 62 as shown in FIG. 5. This positioning recess 62 is engaged by a projection 82 provided on the bracket 81 for defining the relative positions of the projection 82 and the bracket 81.

The bracket 81 is secured to the guide member 61 by a screw 88. The motor unit 7 and guide member 61 are connected by several screws 87. As explained above, the guide member 61 is fixed to the bracket 81 by the screw 88 and their relative positions with respect to one another are defined by the engagement of the recess 62 on the guide member 61 and the projection 82 on the bracket 81. Quite advantageously, the position adjusting device 4 can be completely assembled to confirm its operation without attaching the position adjusting device 4 to the seat back frame or before attaching the position adjusting device 4 to the seat back frame. The drive shaft 51 is operable under the condition that the position adjusting device 4 is not secured to the seat back frame 21, because the components 61,7, 81 are fixedly assembled to one another at their proper operable positions.

Under trial operation of the movable member 42, excess friction force may be generated between the movable member 42 and the guide member 61 due to the strong contact at the projections 58 of the first slidable portion 55. By continuing the trial operation under the condition that the position adjusting device 4 (i.e., the motor unit 7, the movable member 42, the guide member 61 and the drive shaft 51) is not assembled to the seat back frame 21, the device 4 can be self-adjusted to achieve a smooth operation without looseness.

The assembly of the head rest device 3, including the position adjusting device 4, into the seat back frame 21 proceeds as follows. After trial operation of the position adjusting device 4 to adjust the looseness and friction resistance amongst the various parts, the device 4 is assembled into the seat back frame 21 by the screws 49 shown in FIG. 1. This is followed by assembling the seat back cushion 2a and the cover member (not shown). At the final stage of assembly of the seat back, the stay guides 25 are inserted into the stay guide holes 26. The head rest stay shafts 34 of the head rest stay member 33, with the attached head rest frame 31 and the cushion 31, are inserted into the guide holes 26 until they are held in the holes 46 of the movable member 42 by the engagement of the pins 63 with the stopper grooves 37 of the stay shafts 34.

In the event the movable member 42 receives an excessive load during the initial assembly of the head rest 3 to the seat back 2, the gap e provided between tie guide member 61 and the movable member 42 will accommodate and support the excessive load by virtue of the contact between the projection 67 and the guide member 61. Even when the head rest and seat are in actual use and an excessive load is applied to the head rest (e.g., a child hangs on the head rest 3), the load is supported in a similar manner.

The position adjusting device 4 is operated when the occupant of the seat actuates a switch (not shown). The actuation of the switch causes operation or actuation of the motor 71, thus causing the drive shaft 51 to be rotated. Because the nut member 44 is prevented from rotating by the guide member 61 and the slidable portion 55, the movable member 42 moves in the vertical direction to the desired position.

Referring now to the second embodiment of the invention illustrated in FIGS. 9–14, the head rest device 200 includes a head rest body 210 (head rest cushion), a head rest frame 220, a head rest stay 230 secured to the frame 220, and a vertical position adjusting device 300. The head rest device 200 is disposed in a recessed portion 110a of a seat back 110 of a vehicle rear seat 100. The vertical position adjusting device 300 is disposed in the seat back and is attached to a seat back frame 120 for vertically adjusting the height of the head rest device 200 with respect to the seat back 110.

Figure 9:
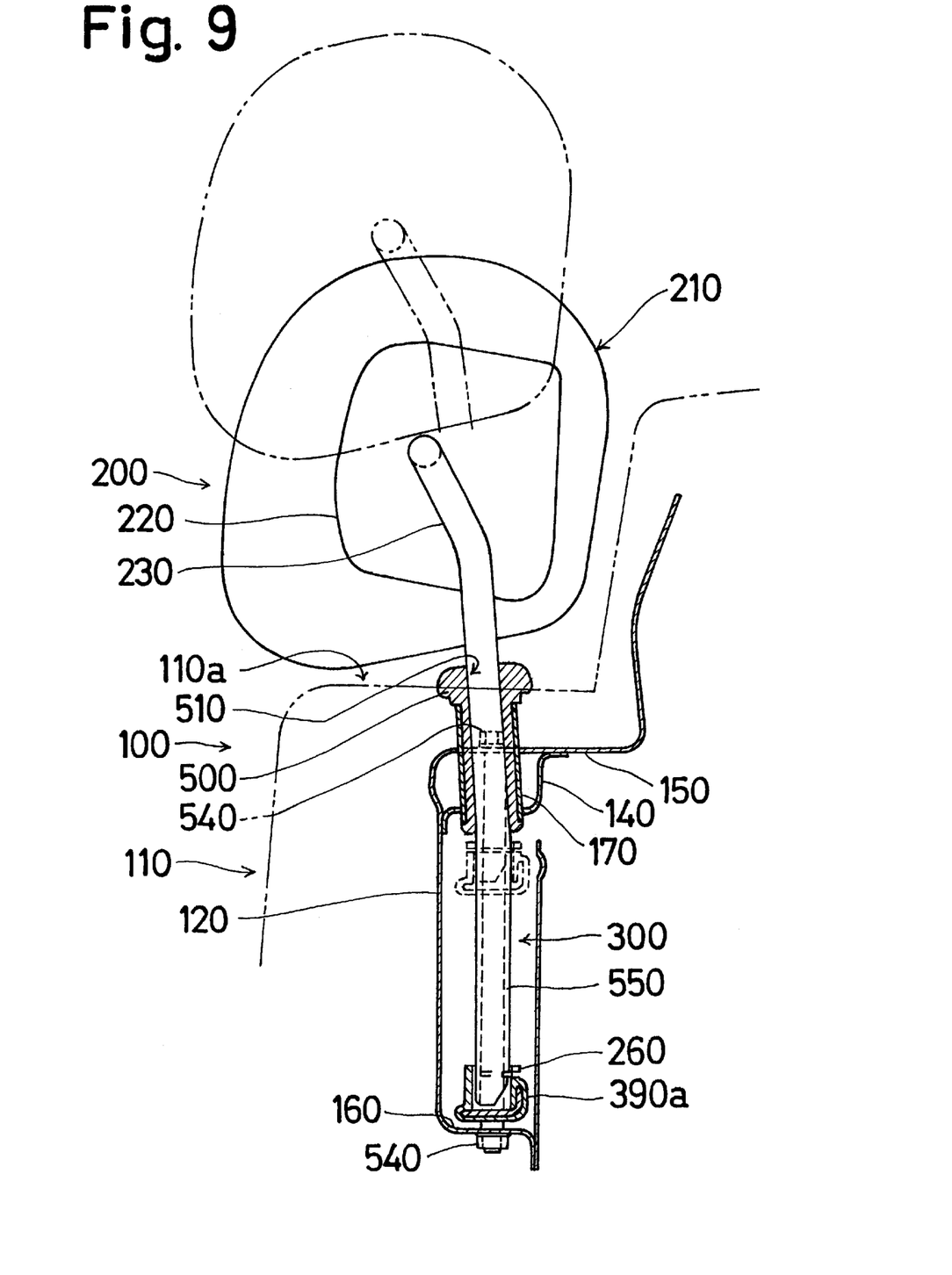
FIG. 9 is a cross-sectional view of the head rest according to a second embodiment of the present invention.

The head rest stay 230 is connected to the head rest frame 220 and includes a pair of stay shaft portions extending downwardly into the seat back frame 120. Each stay shaft portion is curved or inclined along its longitudinal center portion as shown in FIG. 9 to expand rearward in the vehicle longitudinal direction (in the right direction in FIG. 9). The upper portion of the seat back frame 120 is provided with a flat (horizontal) wall portion 150 extending in the lateral direction of the vehicle. A reinforcing member 140 is provided below the flat wall portion 150 to strengthen the seat back frame 120.

Figure 13:
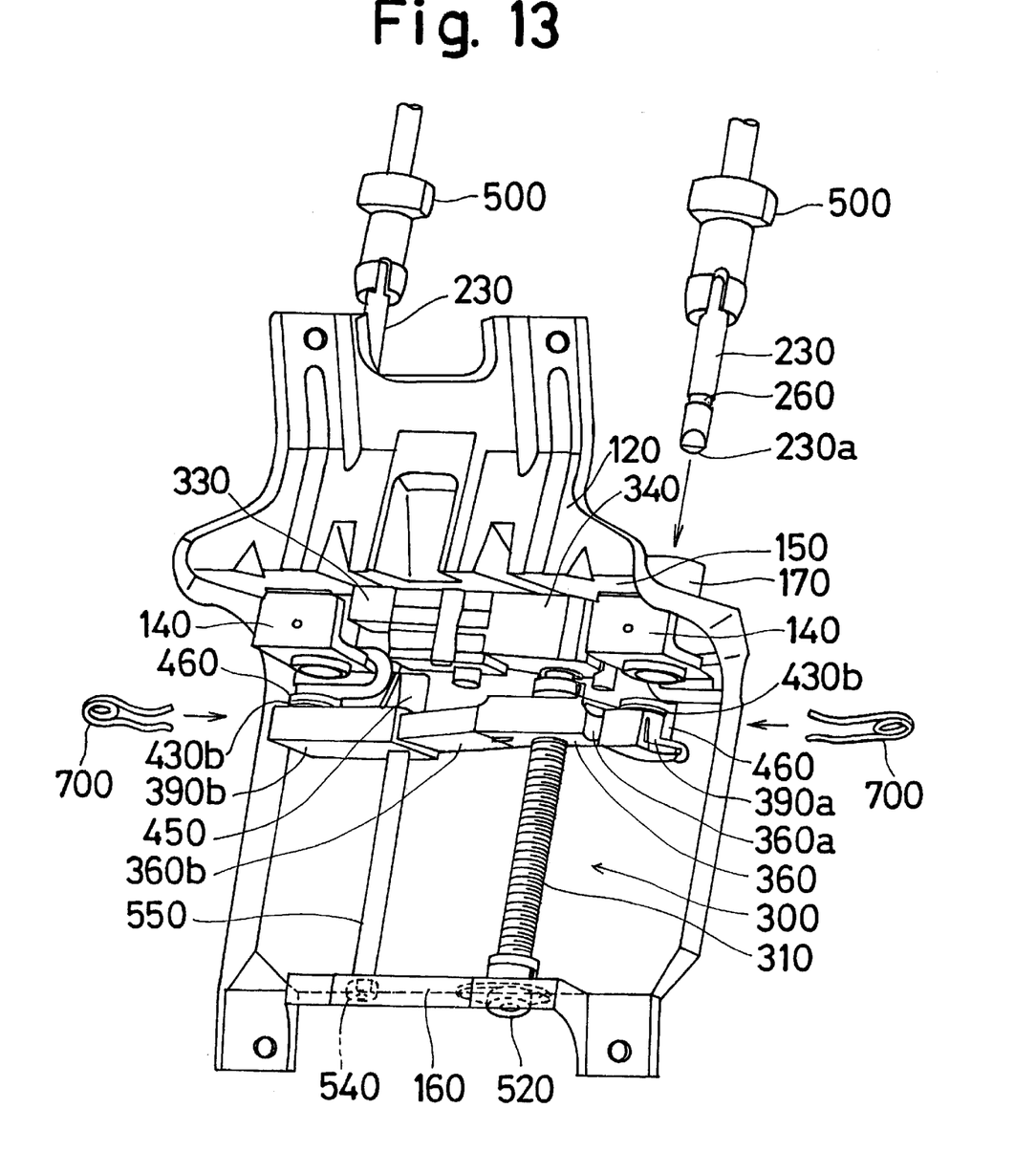
FIG. 13 is a perspective view of the second embodiment of the head rest.

Cylindrical guide holders 170 are rigidly inserted into holes of the flat wall portion 150 and the reinforcing member 140 and are welded to each other. Both ends of the holder 170 are open. Respective stay guides 500 are rigidly inserted into the guide holders 170 for guiding the vertical movement of the stay shaft portions of the stays 230. The cylindrical guide holders 170, the stay guides 500 and other portions are provided in pairs as seen in FIG. 13, but for explanatory purposes only a single one of each element will be explained here, it being understood that the description applied also to the other component of the pair.

The stay guide 500 is provided with an axially extending hole 510 into which the stay shaft portion of the stay 230 is slidably supported. The curvature or inclination of the axial hole 510 of the stay guide 500 is the same as the curvature or inclination of the bending portion of the stay shaft so that the stay shaft is able to smoothly slide within the axial hole 510.

Another horizontal flat wall portion 160 is provided at the lower end of the seat back frame 120. The vertical position adjusting device 300 is disposed between the two flat wall portions 150, 160 of the seat back frame 120. The vertical position adjusting device 300 includes a drive motor 330 (shown in FIG. 13) secured to the under-surface of the flat wall portion 150, a reduction gear mechanism (not shown), a screw rod 310 operatively connected to the reduction gear mechanism to receive the rotational torque from the motor 330, and a nut member 380 (shown in FIG. 14).

Figure 14:
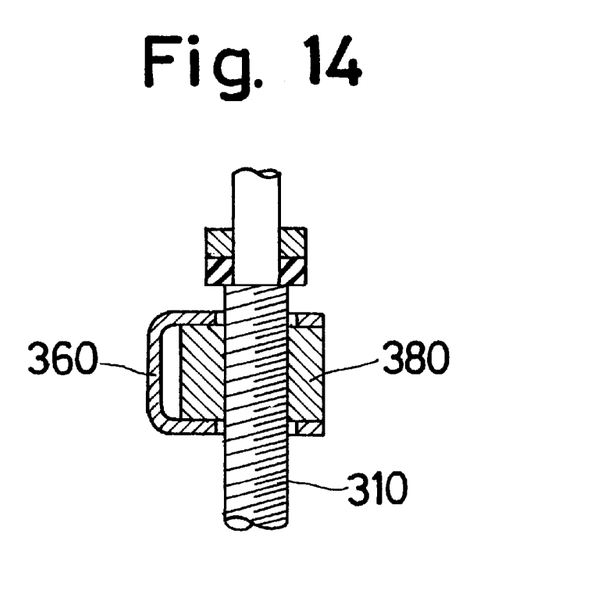
FIG. 14 is a cross sectional view of the nut and screw rod used in the second embodiment of the head rest.

The upper end of the screw rod 310 is rotatably connected to the gear housing 340 of the motor 330 and the lower end of the screw rod 310 is supported by a bearing 520 secured to the flat wall portion 160. The nut member 380 is sandwiched between the legs of a base plate 360 having a generally U-shaped cross-section as shown in FIG. 14.

Figure 10:
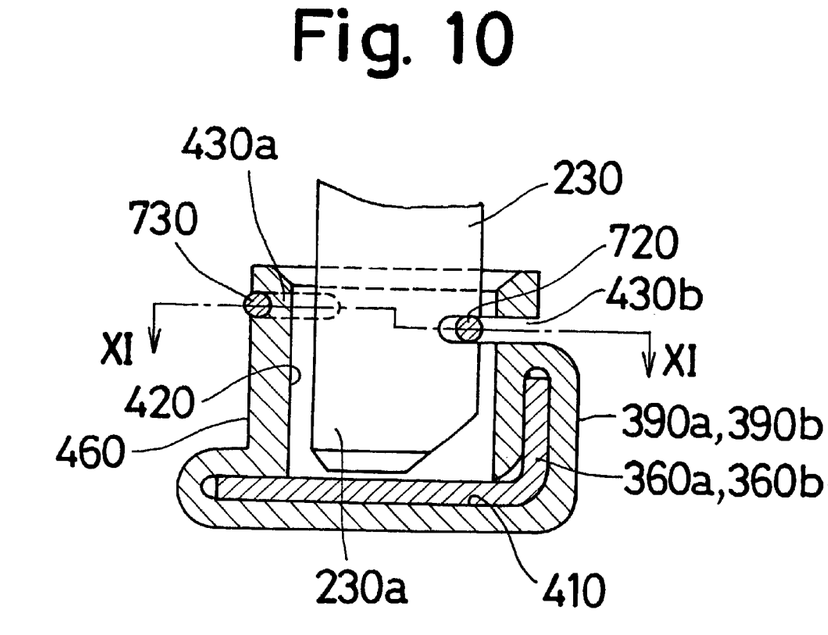
FIG. 10 is a cross-sectional view of a portion of the second embodiment of the head rest taken along the section line X—X in FIG. 11.
Figure 11:
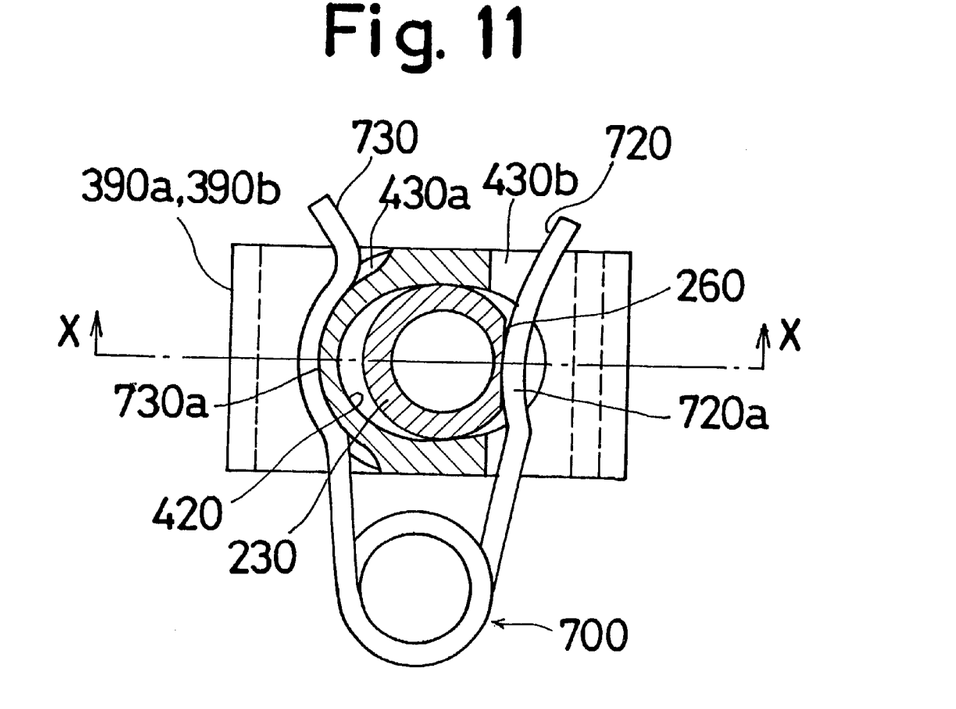
FIG. 11 is a cross-sectional view of a portion of the second embodiment of the head rest taken along the section line XI—XI in FIG. 10.
Figure 12:
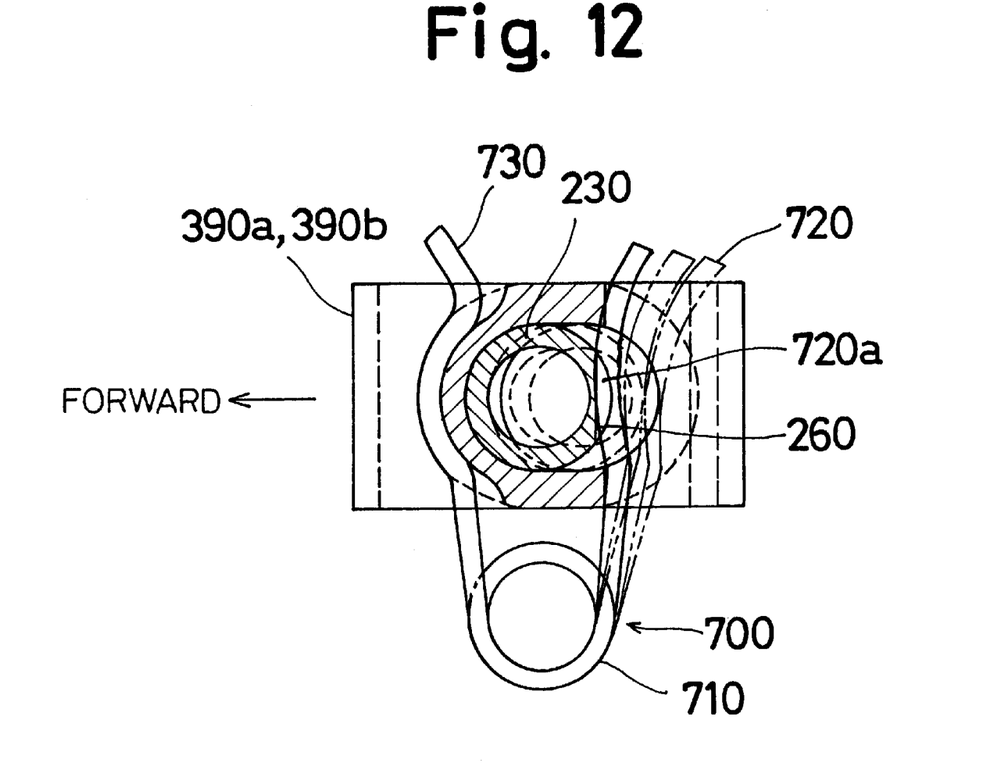
FIG. 12 is a plan view of a portion of the second embodiment of the head rest illustrating the engagement condition of the movers and coil spring.

The base plate 360 has a pair of L-shaped ends 360*a*, 360*b* extending in the lateral direction of the seat back, with each of the ends 360*a*, 360*b* being engaged with a mover 390*a*, 390*b* at an L-shaped hole 410 provided in the movers 390*a*, 390*b* as shown in FIG. 10.

One of the movers 390*b* is formed with a bearing portion 450 provided with a vertical hole. The guide rod 550 is inserted into the vertical hole of the bearing portion 450. The guide rod 550 is secured at its upper end to the flat wall portion 150 and at its lower end to the flat wall portion 160 by screws 540 so that the guide rod 550 is secured to the seat back frame 120. Accordingly, the rotational movement of the nut member 380 is restricted by the base plate 360.

Each mover 390*a*, 390*b* includes a boss portion 460 having an elongated upwardly open hole 420 possessing a larger diameter in the longitudinal direction and a smaller diameter in the lateral direction of the vehicle. The smaller diameter of the hole 420 is slightly larger than the outer diameter of the stay portion of the head rest stay 230.

A pair of recessed grooves 430*a*, 430*b* is provided at the upper peripheral portion of the boss portion 460 and are opposed to each other in the longitudinal direction. One of the recessed grooves 430*b* is recessed relatively deeply to extend into or communicate with the hole 420 from the peripheral portion. The other recessed groove 430*a* is relatively shallow and does not reach or extend into the hole 420. The recessed groove 430*a* possesses a circular bottom, with a predetermined thickness being maintained between the bottom of the groove 430*a* and the elongated hole 420 at the boss portion 460.

The lower end 230*a* of the head rest stay 230 is inserted into the elongated hole 420 from the upper opening. A horizontal groove 260 is provided at the outer peripheral portion of the lower end 230*a* of the head rest stay 230.

A coil spring 700 engages the recessed grooves 430*a*, 430*b*. The coil spring 700 includes a coil portion 710 shown in FIG. 12 that is formed in a spiral shape with spring steel wire, and a pair of spring bar portions 720, 730 extending from the coil portion 710. One of the bar portions 720 is received in the recessed groove 430*b* and engages the horizontal groove 260 of the head rest stay 230.

When the stay 230 is moved within the elongated hole 420, the spring bar portions 720, 730 are kept in the groove 260 of the lower end 230*a* of the stay 230 by the spring force associated with the coil spring 700.

The bottom of the groove 260 is formed with a flat surface in the horizontal direction and the spring bar portion 720 has a bent or slightly curved portion 720*a* that is bent or slightly curved towards the other spring bar portion 730. Even when the groove 260 is moved in the longitudinal direction, the spring bar portion 720 is always kept in contact with the flat surface of the groove 260 at the top of the bending portion 720*a*.

The other spring bar portion 730 also has a bent or slightly curved portion 730*a* for always contacting the corresponding bottom of the recessed groove 430*a*. The bent or slightly curved portion 730*a* bends or curves away from the other spring bar portion 720. The spring force of the coil spring 700 is preset to exert enough pressure to hold the spring bar portions 720, 730 in the grooves 260, 430*a*.

When the rotational torque from the drive motor 330 is transmitted to the screw rod 310 via the reduction gear mechanism, the nut member 380 is urged to be rotated. Due to the engagement between the nut member 330 and the base plate 360, the rotational movement of nut member 330 is restricted and so the nut member 330 moves in the vertical direction together with the movers 390*a*, 390*b*. The upward and downward movement of the movers 390*a*, 390*b* causes the head rest stay which is connected to the movers 390*a*, 390*b* at the lower end 230 to move vertically. The vertical movement of the stay 230 adjusts the height of the head rest to the occupant's desired position. The movers 390*a*, 390*b* are movable on the linear track within the range defined by the guide rod 550 and the screw rod 310.

The head rest 200 is thus movable in the upward and downward direction along a curved track defined by the curvatures of the guide hole 510 and the stay guide 500 which slidably accommodates the head rest stay 230. With this structure and operation, the head rest 200 is forwardly positioned for allowing the occupant to rest their head at the adjusted position, with the gap between the head of the occupant and the head rest 200 being as small as possible.

During the vertical adjusting movement of the head rest 200, the lower end 230*a* of the stay 230 is movable in the vertical direction on the curved or generally angularly oriented track defined by the guide 500, and the difference between the linear movement and the circular movement causes movement of the lower end 230*a* in the forward and rearward directions within the elongated holes 420 of the movers 390*a*, 390*b*. The lower end 230*a* of each stay 230 is held in the respective mover 390*a*, 390*b* by the engagement of the spring bar portions 720, 730 with the grooves 260, 430*a*.

To design the displacement of the lower end 230*a* of the stay 230 within the elongated hole 420 to be a minimum through the all adjusting travel of the head rest 200, the lower end 230*a* should be in the same position within the elongated hole 420 when the head rest 200 is at the uppermost and lowermost positions.

According to this embodiment of the invention, because the movable members of the position adjusting device 300 move on a linear movement track within the seat back 110, the thickness of the seat back 110 in the longitudinal direction of the vehicle is minimized, thus maximizing the interior space in the vehicle. Also, the screw rod 310 and the guide rod 550 are spaced apart from one another in the lateral direction of the seat back (i.e., the lateral direction of the vehicle). The screw rod 310 and the guide rod 550 lie in a plane extending generally in the lateral direction of the seat back (i.e., the lateral direction of the vehicle).

Further, when the head rest 200 moves upwardly, the head rest 200 moves slightly forward with respect to the vertical track so that the gap between the occupant's head and the head rest 200 is minimized.

According to the second embodiment of the present invention, the curvatures or inclinations of the head rest stay 230 and the stay guide 500 are designed to be approximately the same and the stay 230 is slidably moved in the vertical direction by receiving the load on the relatively large sliding area. There is thus no need for a bearing element which receives the concentrated load at the fulcrum point with a small bearing surface.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention.

What is claimed is:

1. A head rest device for a vehicle seat comprising:
   a stay member attached to an upper portion of a seat back of a vehicle seat and supporting a head rest, the stay member including a pair of stay shafts extending downwardly from the head rest;
   a position adjusting device disposed in the seat back for adjusting a position of the head rest relative to the seat back, the position adjusting device including a drive motor, a drive shaft operatively connected to and extending from the drive motor, a vertically movable nut member engaging the drive shaft, a movable member secured to the nut member and vertically movable with the nut member, a plate member forming a guide member for guiding the vertical movement of the movable member, and a stopper member connecting the movable member with a lower end of each stay shaft of the stay member for restricting the position of each stay shaft with respect to the movable member, the drive shaft and the guide member being disposed in the seat back and parallel to one another, the drive shaft and the guide member extending downwardly and being separately arranged in a lateral direction of the seat back of the vehicle seat.

2. A head rest device according to claim 1, wherein the plate member forming the guide member is U-shaped.

3. A head rest device according to claim 1, wherein tile movable member includes projections extending towards the plate member forming the guide member.

4. A head rest device for a vehicle seat comprising:
   a stay member attached to an upper portion of a seat back of a vehicle seat and supporting a head rest, the stay member including a pair of stay shafts extending downwardly from the head rest;
   a position adjusting device disposed in the seat back for adjusting a position of the head rest relative to the seat back, the position adjusting device including a drive motor, a drive shaft operatively connected to and extending from the drive motor, a vertically movable nut member engaging the drive shaft, a movable member secured to the nut member and vertically movable with the nut member, a guide member for guiding the vertical movement of the movable member, and a stopper member connecting the movable member with a lower end of each stay shaft of the stay member for restricting the position of each stay shaft with respect to the movable member, the drive shaft and the guide member being disposed in the seat back and parallel to one another, the drive shaft and the guide member extending downwardly and being separately arranged in a lateral direction of the seat back of the vehicle seat; said movable member including a first sliding portion slidably contacting the guide member under operation in which said movable member receives a load below a predetermined load level, and a second sliding portion slidably contacting the guide member only when the movable member receives a load larger than the predetermined load level.

5. A head rest device for a vehicle seat comprising:
   a stay member attached to an upper portion of a seat back of a vehicle seat and supporting a head rest, the stay member including a pair of stay shafts extending downwardly from the head rest;
   a position adjusting device disposed in the seat back for adjusting a position of the head rest relative to the seat back, the position adjusting device including a drive motor, a drive shaft operatively connected to and extending from the drive motor, a vertically movable nut member engaging the drive shaft, a movable member secured to the nut member and vertically movable with the nut member, a guide member for guiding the vertical movement of the movable member, and a stopper member connecting the movable member with a lower end of each stay shaft of the stay member for restricting the position of each stay shaft with respect to the movable member, the drive shaft and the guide member being disposed in the seat back and parallel to one another, the drive shaft and the guide member extending downwardly and being separately arranged in a lateral direction of the seat back of the vehicle seat;
   each of the stay shafts of the stay member including a curved longitudinal intermediate portions and the guide member having a pair of guide holes for slidably receiving the stay shafts, each of the guide holes having a bending portion bent to correspond to the curved longitudinal intermediate portion of one of the stay shafts.

6. A head rest device according to claim 5, wherein said stopper member restricts vertical movement of the lower end of each stay shaft relative to the movable member while also allowing lateral movement of the lower end of each of the stay shafts.

7. A head rest device according to claim 6, wherein said stopper member includes a coil spring engaged with the movable member and the lower end of each stay shaft.

8. A head rest device according to claim 7, wherein a portion of the coil spring engages a flat surface on said stay shaft.

9. A head rest device for a vehicle seat comprising:
   a stay member attached to an upper portion of a seat back of a vehicle seat and supporting a head rest, the stay member including at least one stay shaft extending downwardly from the head rest;
   a position adjusting device disposed in the seat back for adjusting a position of the head rest relative to the seat back, the position adjusting device including a drive motor, a threaded drive shaft operatively connected to and extending from the drive motor, a nut member threadably engaging the drive shaft and vertically movable along the drive shaft, a movable member secured to the nut member and vertically movable with the nut member, and a guide member for guiding the vertical movement of the movable member, the drive shaft and the guide member being disposed substantially parallel to one another and being spaced apart from one another in a plane extending in a lateral direction of the seat back;
   each of the stay shafts of the stay member including a curved longitudinal intermediate portion, and the guide member having a pair of guide holes for slidably receiving the stay shafts, each of the guide holes having a bending portion bent to correspond to the curved longitudinal intermediate portion of one of the stay shafts.

10. A head rest device according to claim 9, including a spring engaging a lower end of each stay shaft to secure each stay shaft with respect to the movable member in the vertical direction while also permitting lateral movement of the lower end of each stay shaft.

11. A head rest device according to claim 10, wherein the spring is a coil spring, a portion of the coil spring engaging a flat surface on said stay shaft.

12. A head rest device for a vehicle seat comprising:

a stay member attached to an upper portion of a seat back of a vehicle seat and supporting a head rest, the stay member including at least one stay shaft extending downwardly from the head rest;

a position adjusting device disposed in the seat back for adjusting a position of the head rest relative to the seat back, the position adjusting device including a drive motor, a threaded drive shaft operatively connected to and extending from the drive motor, a nut member threadably engaging the drive shaft and vertically movable along the drive shaft, a movable member secured to the nut member and vertically movable with the nut member, and a guide member for guiding the vertical movement of the movable member, the drive shaft and the guide member being disposed substantially parallel to one another and being spaced apart from one another in a plane extending in a lateral direction of the seat back;

the guide member being a plate member, and the movable member including a slidable portion having an opening that receives the plate member, the slidable portion including two oppositely positioned first projections extending from an inner surface of the slidable portion to engage the plate member.

13. A head rest device according to claim 12, wherein the slidable portion includes two oppositely positioned second projections extending from an inner surface of the slidable portion to engage the plate member.

14. A head rest device according to claim 12, wherein the plate member possesses a U-shaped cross-section.

15. A head rest device for a vehicle seat comprising:

a stay member attached to an upper portion of a seat back of a vehicle seat and supporting a head rest, the stay member including at least one stay shaft extending downwardly from the head rest;

a position adjusting device disposed in the seat back for adjusting a position of the head rest relative to the seat back, the position adjusting device including a drive motor, a threaded drive shaft operatively connected to and extending from the drive motor, a nut member threadably engaging the drive shaft and vertically movable along the drive shaft, a movable member secured to the nut member and vertically movable with the nut member, and a guide member for guiding the vertical movement of the movable member, the drive shaft and the guide member being disposed substantially parallel to one another and being spaced apart from one another in a plane extending in a lateral direction of the seat back;

said movable member including a first sliding portion slidably contacting the guide member under operation in which said movable member receives a load below a predetermined load level, and a second sliding portion slidably contacting the guide member only when the movable member receives a load larger than the predetermined load level.

16. A head rest device for a vehicle seat comprising:

a stay member attached to an upper portion of a seat back of a vehicle seat and supporting a head rest, the stay member including at least one stay shaft extending downwardly from the head rest;

a position adjusting device disposed in the seat back for adjusting a position of the head rest relative to the seat back, the position adjusting device including a drive motor, a threaded drive shaft operatively connected to and extending from the drive motor, a nut member threadably engaging the drive shaft and vertically movable along the drive shaft, a movable member secured to the nut member and vertically movable with the nut member, and a plate member forming a guide member for guiding the vertical movement of the movable member, the drive shaft and the guide member being disposed substantially parallel to one another and being spaced apart from one another in a plane extending in a lateral direction of the seat back.

17. A head rest device according to claim 16, wherein the plate member forming the guide member is U-shaped.

18. A head rest device according to claim 16, wherein the movable member includes projections extending towards the plate member forming the guide member.

* * * * *